Patented Oct. 27, 1953

2,657,167

UNITED STATES PATENT OFFICE 2,657,167

CHLORINATED TERPENE DERIVATIVE

Warren L. Walton, Schenectady, N. Y., assignor to Hercules Powder Company, Wilmington, Del., a corporation of Delaware No Drawing. Application October 13, 1950, Serial No. 190,061

18 Claims. (Cl. 167—30)

This invention relates to new polychloro terpene derivatives and more particularly to chlorinated terpene-polyhalomethane adducts and to insecticidal compositions containing these new products as the toxic ingredient.

In accordance with this invention it has been found that the adduct of a cyclic terpene and a polyhalomethane may be chlorinated to form a chlorinated cyclic terpene-polyhalomethane adduct, which compounds, containing from about 54% to about 75% chlorine have a high degree of insecticidal activity.

The following examples illustrate the preparation of the new chlorinated terpene adducts in accordance with this invention and the high insecticidal activity of compositions containing these new compounds. All parts and percentages are by weight unless otherwise specified.

Example I

One hundred parts of a β-pinene-carbon tetrachloride adduct, having a melting point of 44°–45° C. and a chlorine content of 49.2%, was dissolved in 317 parts of carbon tetrachloride. The mixture was warmed to 70° C. and was exposed to bright light and sparged with chlorine at the rate of about 25 parts per hour. The temperature held at about 70° C. due to the refluxing solvent during the chlorination. Aliquots of the reaction mixture were removed at intervals to obtain the adduct at various stages of chlorination. The solvent was removed from each aliquot by heating at 95° C. at 35 mm. pressure.

The chlorinated β-pinene-carbon tetrachloride adducts are viscous, amber-colored liquids. Each of the 9 samples of chlorinated adducts, of different chlorine content, was tested for its insecticidal activity against houseflies. In this and the following examples, the test for insecticidal activity against houseflies was made in the following manner and is referred to in this specification as the bell jar method.

Approximately 100 five-day old flies (Musca domestica) were placed in a bell jar and a predetermined quantity of the insecticide to be tested was atomized into the bell jar. The quantity of insecticide used was equal to the amount of the official test insecticide which was necessary to give a 30–55% kill and must be within the limits of 0.4 to 0.6 ml. After spraying the insecticide into the chamber, the flies were placed in an observation cage containing a wad of cotton wet with a dilute sugar solution. At the end of 24 hours, the number of dead and moribund flies was counted. All tests were carried out at 80°–90° F. and 50–75% relative humidity.

The following table gives the chlorine content of each of the chlorinated adducts and the results obtained on testing 5% and 2.5% solutions of these products in deodorized kerosene. The data are an average of a series of tests made on each solution.

| Percent Chlorine | 5% Solution | | 2.5% Solution | |
|---|---|---|---|---|
| | Percent Dead in 24 Hrs. | O. T. I. Difference | Percent Dead in 24 Hrs. | O. T. I. Difference |
| 56.8 | | | 73 | +35 |
| 60.1 | 99 | +61 | 99 | +61 |
| 62.1 | 100 | +62 | 100 | +62 |
| 63.1 | 100 | +62 | 100 | +62 |
| 67.1 | 100 | +52 | 99 | +51 |
| 70.5 | 100 | +52 | 96 | +48 |
| 71.3 | 99 | +51 | 94 | +46 |
| 72.1 | 100 | +52 | 89 | +41 |
| 72.8 | 96 | +48 | 70 | +22 |

Example II

One hundred parts of a dipentene-carbon tetrachloride adduct, having a boiling point of 103°–138° C. at 0.5–2.2 mm. pressure and a chlorine content of 46.5%, was dissolved in 317 parts of carbon tetrachloride. The solution was exposed to ultraviolet light and was sparged with chlorine. Aliquots were removed at intervals as the chlorination proceeded and the solvent was removed from each aliquot.

The chlorinated dipentene-carbon tetrachloride adducts are viscous, amber-colored liquids. Solutions containing 2.5% and 5% of the chlorinated adducts in deodorized kerosene were tested for their insecticidal activity by the bell jar method with the following results.

| Percent Chlorine | 5% Solution | | 2.5% Solution | |
|---|---|---|---|---|
| | Percent Dead in 24 Hrs. | O.T.I. Difference | Percent Dead in 24 Hrs. | O.T.I. Difference |
| 63.3 | 100 | +66 | 83 | +49 |
| 69.5 | 90 | +56 | 78 | +44 |

Example III

Fifty parts of a β-pinene-bromoform adduct, having a boiling point of 110°–135° C. at 2 mm. pressure and a bromine content of 49.5%, was dissolved in 800 parts of carbon tetrachloride. Chlorine was passed into the agitated solution in the presence of ultraviolet light and samples were removed at the end of 6 and 10 hours of chlorination. The solvent was removed from each sample by heating under reduced pressure and sparging with nitrogen, leaving viscous yellow liquids in each case which, upon cooling, became brittle solids.

The chlorinated β-pinene-bromoform adducts contained 55% and 60% chlorine and 21% and 18.5% bromine, respectively. A 5% solution of each in deodorized kerosene was tested for its insecticidal activity against houseflies by the bell jar method with the following results:

| Percent Halogen | | Percent Dead in 24 Hrs. | O.T.I. Difference |
|---|---|---|---|
| Chlorine | Bromine | | |
| 55 | 21 | 100 | +55 |
| 60 | 18.5 | 61 | +16 |

The cyclic terpene-polyhalomethane adducts which are chlorinated in accordance with this invention are prepared by reacting any cyclic terpene with a polyhalomethane in the presence of a peroxide catalyst. A temperature of reaction within the range of about 40° C. to about 160° C. is generally used. Suitable monocyclic terpenes which are used to prepare these adducts are dipentene, terpinolene, α-terpinene, β-terpinene, gamma-terpinene, α-phellandrene, β-phellandrene, terpineol, limonene, p-menthenes, etc. Bicyclic terpenes which are used to form these adducts are α-pinene, β-pinene, camphene, bornylene, fenchene, etc. The polyhalomethanes which are reacted with the cyclic terpene to form the adduct include methylene chloride, methylene bromide, chloroform, bromoform, iodoform, carbon tetrachloride, carbon tetrabromide, carbon tetraiodide, monobromotrichloromethane.

This process is described and claimed in application Serial No. 716,187, filed December 13, 1946, by R. H. Saunders.

The cyclic terpene polyhalomethane adducts are chlorinated at any temperature at which chlorination will take place but below the decomposition point of the product. To avoid any decomposition, the chlorination is carried out below the boiling temperature of the material being chlorinated. The temperature of chlorination is generally kept below about 150° C. and is ordinarily carried out above 0° C., since at low temperatures the rate of chlorination may be impractically slow. The usual range of chlorination temperature is 50° C. to about 100° C. While initial stages of chlorination may be carried out at low temperatures, the final stages of chlorination are carried out in the range of 50–100° C. in order to reach a sufficiently high chlorine content to reach the maximum toxicity.

The chlorination may be carried out in the presence or absence of catalysts but the reaction rate is impractically slow, especially toward the end of the chlorination, in the absence of catalysts and catalysts are, therefore, generally used for practical operation. Light is one of the most satisfactory catalysts and this is preferably actinic light. It acts by accelerating formation of free radicals. Other catalysts which also form free radicals may be used by adding them to the chlorination mixture either at the beginning, during the course of, or toward the end of the chlorination process. As catalysts, one may use such free radical formers as lead alkyls and organic peroxides including peroxy acids and peroxy anhydrides including benzoyl peroxide and acetyl peroxide. Only a catalystic amount of catalyst is needed and, if used up in the process, more will be added as required. More than a catalytic amount will not ordinarily be added at one time since better control is obtained by using only as much as is necessary for attaining the desired rate of chlorination. The preferred catalysts are the organic peroxides, particularly benzoyl peroxide. The amount of catalyst used in the chlorination is that amount necessary to accelerate the chlorination and will ordinarily be within the range of about 0.001 to 5% based upon the chlorination mixture.

The chlorination is generally carried out on the adduct in the liquid state with gaseous chlorine. For instance, a volatile chlorinated solvent such as methylene chloride, chloroform, carbon tetrachloride, ethylene chloride, trichloroethane, tetrachloroethane or pentachloroethane is generally used in order to maintain the liquid state and to reduce the viscosity sufficiently for good contact. Any well-known means of contacting the chlorine with the cyclic terpene-polyhalomethane adduct may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of cyclic terpene-polyhalomethane adduct being chlorinated and is generally within the range of 1 to 5 volumes per volume of cyclic terpene-polyhalomethane adduct. Whether a solvent is used or not, the chlorine is added to the reaction mixture substantially at the rate at which it is consumed in the reaction.

The chlorinated cyclic terpene-polyhalomethane adduct may be readily purified and freed of catalysts by washing with water until sufficiently free of hydrochloric acid and then washing with mild alkali until neutral. The catalysts are ordinarily completely removed by this procedure. After purification, the solvent is removed by distillation, preferably under reduced pressure.

The chlorinated cyclic terpene-polyhalomethane adducts are viscous liquids or brittle solids and soluble in most organic solvents. The chlorination may be carried out until a compound containing any desired amount of chlorine is formed. For example, it is possible to prepare a compound containing only one chlorine atom per molecule in addition to the halogen atoms of the polyhalomethane group or one containing several chlorine atoms in addition to the halogen atoms of the polyhalomethane group. Thus, if the chlorination proceeded to completion, all of the hydrogen atoms of the terpene radical would be replaced by chlorine. If the adduct is one of a cyclic terpene with a polybromomethane, the chlorination of this adduct in some cases could result in the replacement of part of the bromine atoms of the polybromomethane group with chlorine atoms.

The chlorinated terpene-polyhalomethane adducts are useful for a variety of applications such as in fabric coatings, as plasticizers and in fire- and water-proofing compositions. They are of particular value in the insecticidal field where they may be used as the toxic ingredient of insecticidal compositions due to their very high insecticidal activity. It has been found that the chlorinated terpene-polyhalomethane adducts which contain from about 54% to about 75% chlorine have an outstanding insecticidal activity. Thus, in the case of the terpene-carbon tetrachloride adducts, the compound must contain at least one chlorine atom in addition to the four chlorine atoms from the carbon tetrachloride and, in the case of the terpene-chloroform adducts, the compound must contain at least two chlorine atoms in addition to the three chlorine atoms from the chloroform, in order to have insecticidal activity. In the case of the terpene-polybromomethane adducts, it is necessary to introduce a larger number of chlorine atoms in order to obtain a product containing 54% chlorine, the amount requisite for insecticidal activity, the bromine in the compound contributing nothing to the insecticidal activity of the compound. The unchlorinated terpene-polyhalomethane adducts have been found to have no practical insecticidal activity.

The insecticidal compositions of this invention are produced by admixing the chlorinated cyclic terpene-polyhalomethane adduct having a chlorine content within the range of about 54% to about 75% with a suitable adjuvant which is an inert material to facilitate the mechanical distribution of the chlorinated cyclic terpene-polyhalomethane adduct toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the chlorinated cyclic terpene-polyhalomethane adduct. Surface-active dispersing agents are used in admixture with the chlorinated cyclic terpene-polyhalomethane adduct to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c. pages 280–287) for use with known insecticides and include soaps of resin, alginic and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12 to 18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl or acyl. Compositions of chlorinated cyclic terpene-polyhalomethane adduct toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the chlorinated cyclic terpene-polyhalomethane adduct mixtures admixed with these inert materials which facilitate the mechanical distribution of the chlorinated cyclic terpene-polyhalomethane adduct in accordance with this invention are those containing the above-listed surface-active dispersing agents and hydrocarbon solvent dispersing agents.

The amount of chlorinated cyclic terpene-polyhalomethane adduct in the composition with the inert material which facilitates the mechanical distribution of the toxicant will depend upon the type of inert material, the use to which it is to be put, and the type of pest to be destroyed. The compositions will generally contain less than about 30% chlorinated cyclic terpene-polyhalomethane adduct. Agricultural dusts will generally contain 10–30% chlorinated cyclic terpene-polyhalomethane adduct. Household sprays will contain from 0.1 to 10% chlorinated cyclic terpene-polyhalomethane adduct. Agricultural sprays will, likewise, contain 0.1 to 10% of the chlorinated cyclic terpene-polyhalomethane adduct. Aqueous emulsions will contain sufficient surface-active dispersing agent to maintain an emulsion of the chlorinated cyclic terpene-polyhalomethane adduct during the spraying process.

For many purposes it may be desirable to use the chlorinated cyclic terpene-polyhalomethane adduct in combination with other insecticidal toxicants. Many toxicants have a very high knockdown in relatively dilute solutions, but higher concentrations must be used in order to obtain the desired degree of kill. Due to the very high degree of killing power which the chlorinated cyclic terpene-polyhalomethane adducts possess, these compounds may be added to such toxicants, thereby enabling the use of much more dilute solutions than would otherwise be possible. Toxicants with which these chlorinated cyclic terpene-polyhalomethane adducts may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combating flies, mosquitoes, roaches, moths, carpet beetles, bedbugs, boll weevils, boll worms, grasshoppers, army worms, and many other pests.

This application is a continuation-in-part of application Serial No. 769,991, filed August 21, 1947, now abandoned.

What I claim and desire to protect by Letters Patent is:

1. The product of chlorination of a cyclic terpene-polyhalomethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a cyclic terpene and a polyhalomethane in the presence of a peroxide catalyst.

2. The product of chlorination of a cyclic terpene-polychloromethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a cyclic terpene and a polychloromethane in the presence of a peroxide catalyst.

3. The product of chlorination of a cyclic terpene-polybromomethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a cyclic terpene and a polybromomethane in the presence of a peroxide catalyst.

4. The product of chlorination of a monocyclic terpene-polychloromethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a monocyclic terpene and a polychloromethane in the presence of a peroxide catalyst.

5. The product of chlorination of a bicyclic terpene-polychloromethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a bicyclic terpene and a polychloromethane in the presence of a peroxide catalyst.

6. The product of chlorination of a bicyclic terpene-polybromomethane adduct dissolved in an inert solvent with chlorine gas in the presence of a free radical-forming chlorination catalyst at a temperature in the range of 50° to 150° C. and containing from about 54% to about 75% chlorine, said adduct being the product formed by heating a bicyclic terpene and a polybromomethane in the presence of a peroxide catalyst.

7. The product of chlorination of a dipentene-carbon tetrachloride adduct dissolved in an inert solvent with chlorine gas in the presence of a free radical-forming chlorination catalyst at a temperature in the range of 50° to 150° C. and containing from about 54% to about 75% chlorine, said adduct being the product formed by heating dipentene and carbon tetrachloride in the presence of a peroxide catalyst.

8. The product of chlorination of a $\beta$-pinene-carbon tetrachloride adduct dissolved in an inert solvent with chlorine gas in the presence of a free radical-forming chlorination catalyst at a temperature in the range of 50° to 150° C. and containing from about 54% to about 75% chlorine, said adduct being the product formed by heating $\beta$-pinene and carbon tetrachloride in the presence of a peroxide catalyst.

9. The product of chlorination of a $\beta$-pinene-bromoform adduct dissolved in an inert solvent with chlorine gas in the presence of a free radical-forming chlorination catalyst at a temperature in the range of 50° to 150° C. and containing from about 54% to about 75% chlorine, said adduct being the product formed by heating $\beta$-pinene and bromoform in the presence of a peroxide catalyst.

10. An insecticidal composition comprising the product of claim 1 and an insecticidal adjuvant as a carrier therefor.

11. An insecticidal composition comprising the product of claim 2 and an insecticidal adjuvant as a carrier therefor.

12. An insecticidal composition comprising the product of claim 3 and an insecticidal adjuvant as a carrier therefor.

13. An insecticidal composition comprising the product of claim 4 and an insecticidal adjuvant as a carrier therefor.

14. An insecticidal composition comprising the product of claim 5 and an insecticidal adjuvant as a carrier therefor.

15. An insecticidal composition comprising the product of claim 6 and an insecticidal adjuvant as a carrier therefor.

16. An insecticidal composition comprising the product of claim 7 and an insecticidal adjuvant as a carrier therefor.

17. An insecticidal composition comprising the product of claim 8 and an insecticidal adjuvant as a carrier therefor.

18. An insecticidal composition comprising the product of claim 9 and an insecticidal adjuvant as a carrier therefor.

WARREN L. WALTON.

References Cited in the file of this patent

Groggins: "Unit Processes in Organic Synthesis," third edition, pages 168 to 259 (1947).